(12) United States Patent
Iliev et al.

(10) Patent No.: US 8,626,917 B2
(45) Date of Patent: Jan. 7, 2014

(54) FILE ACCESS USING COUNTER LOCKING MECHANISM

(75) Inventors: Ivaylo Iliev, Sofia (BG); Vencislav Dimitrov, Pernik (BG); Georgi Stanev, Sofia (BG)

(73) Assignee: SAP AG, Walldorf (DE)

( * ) Notice: Subject to any disclaimer, the term of this patent is extended or adjusted under 35 U.S.C. 154(b) by 112 days.

(21) Appl. No.: 13/422,715

(22) Filed: Mar. 16, 2012

(65) Prior Publication Data

US 2013/0246622 A1    Sep. 19, 2013

(51) Int. Cl.
G06F 15/16    (2006.01)
G06F 12/00    (2006.01)

(52) U.S. Cl.
USPC .......................................... 709/225; 709/203

(58) Field of Classification Search
USPC .................. 709/203, 223–229, 250
See application file for complete search history.

(56) References Cited

U.S. PATENT DOCUMENTS

| | | | | |
|---|---|---|---|---|
| 7,428,539 | B2 * | 9/2008 | Clift et al. | 1/1 |
| 8,145,836 | B2 * | 3/2012 | Nelson et al. | 711/112 |
| 8,347,401 | B2 * | 1/2013 | Werner et al. | 726/27 |
| 2008/0016021 | A1 * | 1/2008 | Gulbeden et al. | 707/1 |
| 2009/0300322 | A1 * | 12/2009 | Mercer | 711/219 |
| 2010/0115207 | A1 * | 5/2010 | Arora et al. | 711/144 |
| 2010/0250809 | A1 * | 9/2010 | Ramesh et al. | 710/200 |
| 2012/0078866 | A1 * | 3/2012 | Oshri et al. | 707/704 |
| 2012/0124291 | A1 * | 5/2012 | Achilles et al. | 711/122 |
| 2013/0019067 | A1 * | 1/2013 | Vilayannur et al. | 711/144 |

* cited by examiner

*Primary Examiner* — Zarni Maung
(74) *Attorney, Agent, or Firm* — Schwegman Lundberg & Woessner, P.A.

(57) ABSTRACT

In an embodiment, a method is provided for accessing a file node. In this method, a file access request specifying a file node to be accessed by way of a file system is received at a server from a client device. A counter is referenced to identify that the file node is being accessed in response to a different file access request. The counter is configured to track whether the file node is being accessed. The file node is provided to the client device when the counter indicates a termination of access to the file node resulting from the different file access request.

20 Claims, 6 Drawing Sheets

FILE ACCESS USING COUNTER LOCKING MECHANISM

FIELD

The present disclosure relates generally to file access. In an example embodiment, the disclosure relates to network access to files by way of a file system by a plurality of users.

BACKGROUND

Generally, a file system may be accessible over a network to one or more users. When a user requests access to the file, the file may be retrieved via the file system and provided to the user if the file is not currently being accessed by another person. While the user is accessing the file, the file may be locked such that other individuals are unable to write to the file.

However, if the file is currently being accessed by another person, the file system server may determine that the file is locked and return an error exception to the user indicating that the file is currently in use. In this case, the user may be able to access a read-only copy of the file, and the server may return a copy of the last saved version of the file. However, if the user wishes to modify the file, the user may need to resubmit the request to access the file at a later time. This may require resubmitting the request several times until the file becomes available, which may result in heavy traffic across the network and at the server, as the server may need to process the request each time it is sent and return an error exception each time the request cannot be processed.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
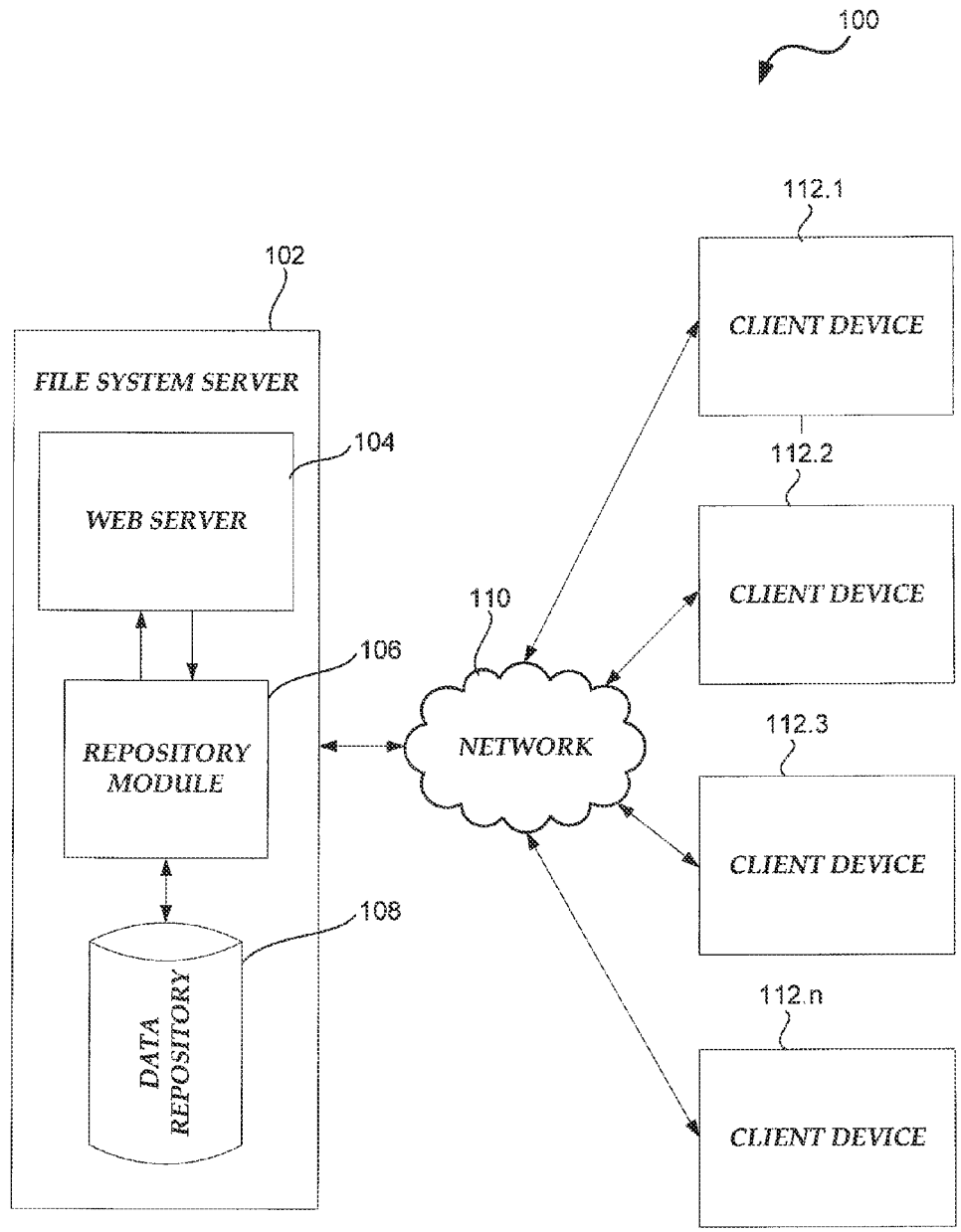
FIG. 1 is a block diagram depicting an architectural overview of a system for accessing files via a network, in accordance with an example embodiment.

The description that follows includes illustrative systems, methods, techniques, instruction sequences, and computing machine program products that embody illustrative embodiments of the present technology. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Some embodiments described herein provide techniques for accessing files or folders containing files at a server. Throughout the description, access to files may be described. However, the description of access to files may similarly be applied to any file node in a file system (e.g., file system directories, etc.). For example, a repository module at the server may receive from a client device a file access request specifying a file to be accessed by way of a file system. A file access request may include a request to read a file or a request to modify a file (e.g., write to, delete, etc.). The repository module may determine whether the file is currently being accessed in response to another file access request by referencing a locking mechanism counter. If the repository module identifies that the file is being accessed in response to the other file access request, the repository module may wait a predetermined amount of time and reference the counter again thereafter. When the counter indicates access to the file resulting from the other file access request has terminated, the file may be provided to the client device.

When the file system server receives a file access request from a client device, the request is held until the requested file becomes available. While the request is being held, the repository module of the server references the locking mechanism counter to determine when the file can be accessed. The locking mechanism counter keeps track of the number of people reading and writing to a file and may be adjusted each time the file is accessed and each time access to the file has terminated.

In some embodiments, the file access request may be a batch request requesting access to a plurality of files. If the batch request is a request to read several files, the files may be returned to the requesting client device as each file becomes available, using the counter associated with each file to determine when each file becomes available. If the batch request is a request to modify several files (e.g., add a file, delete a file, change a file, etc.), the repository server may apply the write command to each file specified in the batch request as each file becomes available, using the counter associated with each file to determine when each file becomes available. For example, a file access request may request that a modification be made to files stored within a folder or to a file which includes content contained in one or more other files. The batch request may result in modification of those files as each of the files associated with the batch request becomes available.

FIG. 1 is a block diagram depicting an architectural overview of a system 100 for accessing files in a file system data repository 108 via a network 110. In some embodiments, the networked system 100 may include any number of client devices, such as client devices 112.1, 112.2, 112.3, 112.n, a network 110, and a file system server 102. The components of the system 100 may be connected directly or over a network 110, which may be any suitable network. In various embodiments, one or more portions of the network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client devices 112.1, 112.2, 112.3, 112.n may be any suitable computing device, such as a smart phone, a personal digital assistant, a mobile phone, a personal computer, a laptop, a computing tablet, or any other device suitable for accessing files from the file system server 102. The client devices 112.1, 112.2, 112.3, 112.n may access the file system server 102 directly, via the network 110, or via a third-party system.

The file system server 102 may be any server managing storage and access to a file system data repository 108. The file system server 102 may include a web server 104, a repository module 106, and a data repository 108. The web server 104 may be capable of providing access to the file system server 102 over the network 110. In some embodiments, the web server 104 may be a JAVA web server (e.g., Apache Tomcat). The data repository 108 may be any storage device capable of storing any number and type of files organized in any manner using a file system.

The file system repository module 106 may manage and control access to the data repository 108. The repository module 106 may use locking mechanism counters to manage file access by keeping track of the number of client devices accessing any particular file. The counters may keep track of writing to files and reading to files in the data repository 108. The repository module 106 is described in more detail below.

Although FIG. 1 illustrates a particular example of the arrangement of client devices 112.1, 112.2, 112.3, 112.n, a network 110, a file system server 102, and components within the file system server 102, this disclosure includes any suitable arrangement or configuration of client devices 112.1, 112.2, 112.3, 112.n, a network 110, a file system server 102, and its components.

Figure 2:
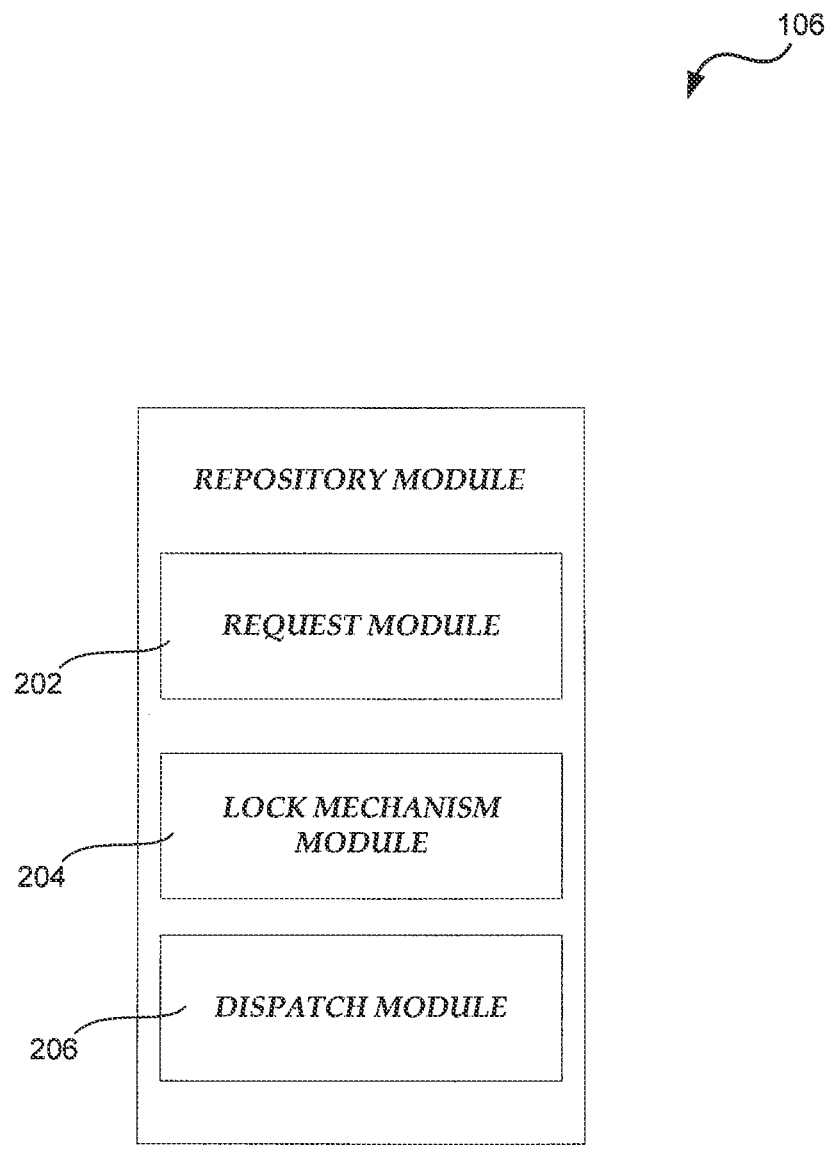
FIG. 2 is a block diagram showing example components of a repository module, in accordance with an example embodiment.

FIG. 2 is a block diagram showing example components of a repository module 106 (FIG. 1). In some embodiments, the repository module 106 may include a request module 202, a lock mechanism module 204, and a dispatch module 206.

The request module 202 may be configured to receive a request to access a file node stored in the data repository 108 (FIG. 1). A file node may be content stored at any particular directory location within the data repository (e.g., a file, a folder having one or more files, a file referencing one or more additional files, etc.). A request may be sent using any web protocol for sending a request over a network and may be received at the request module 202 from a client device (e.g., client device 112.1) via the network 110 (FIG. 1). The request module 202 may be configured to parse a received request to determine information about the file node to be accessed, such as, e.g., the file node specified in the request (or file nodes specified if the file access request is a batch request), whether the request involves reading or writing to the file node, etc.

The lock mechanism module 204 may be configured to use the information parsed from the file access request received at the request module 202 to track access to a file node and identify whether the file node to be accessed is currently being accessed due to another file access request. For example, another client device may be accessing the file node specified in the request when the request is received. The lock mechanism module 204 may identify access to a file node by referencing a mechanism counter associated with the file node. A lock mechanism counter may track whether a file node is being accessed and when that access is terminated, whether the file node is being read or being written to, the number of client devices accessing the file node, etc. The counter is described in more detail below.

The dispatch module 206 may be configured to provide the client device with access to the file node requested if the counter indicates that the file node is available to be accessed (e.g., the file node is not being accessed by another client device). If the file access request is a request to read a file, the dispatch module 206 may access the file, create a copy of the file, and provide the copy of the file to the requesting client device via the network 110 (FIG. 1). If the file access request is a request to write to a file, the dispatch module 206 may provide access to the file via the network 110 so that the file may be modified and saved in the data repository 108 (FIG. 1).

Figure 3:
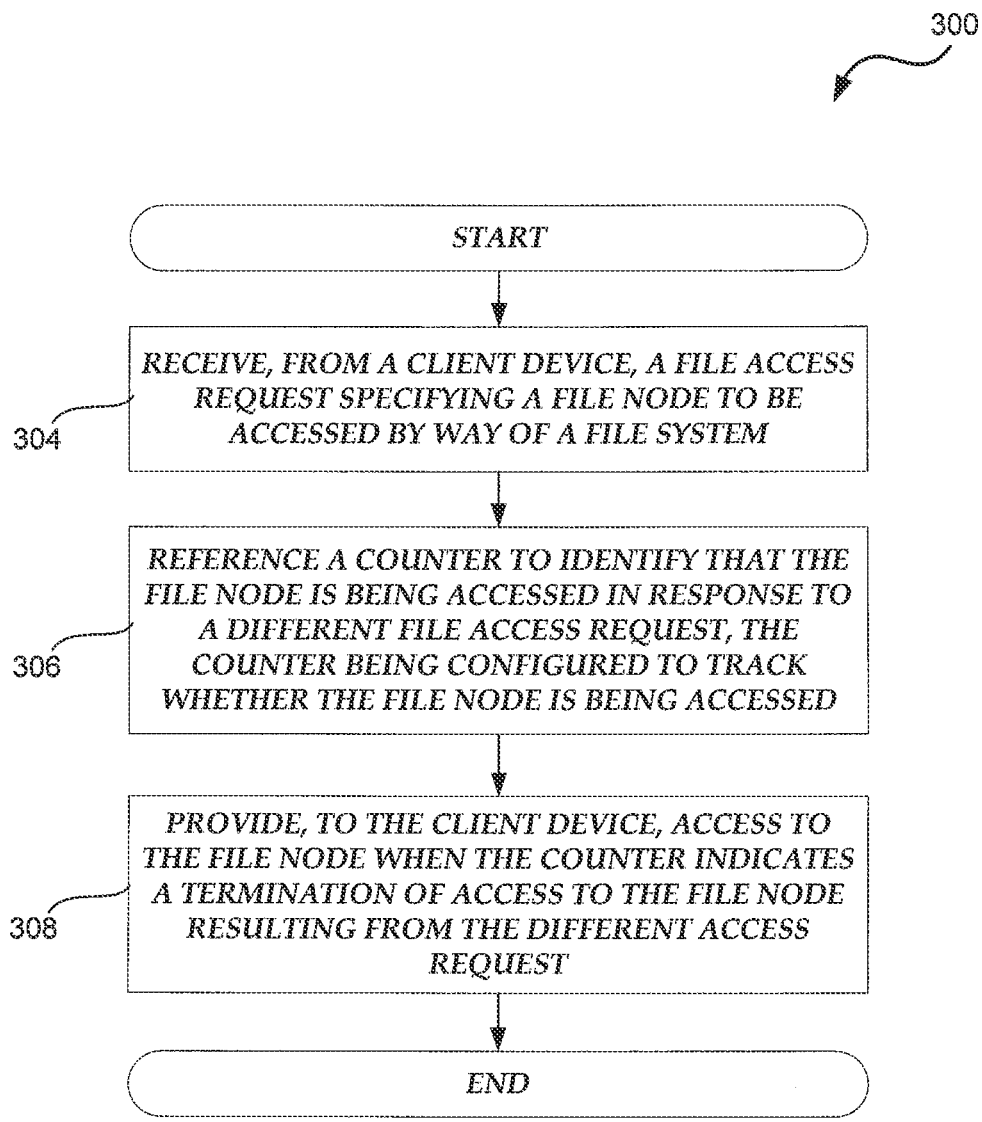
FIG. 3 is a flow diagram of a method of accessing a file node, in accordance with an example embodiment.

FIG. 3 is a flow diagram of a method 300 of accessing a file node. In an example embodiment, the method 300 may be implemented by the repository module 106 included in the system 100 of FIG. 1.

In operation 304 of method 300, the request module 202 (FIG. 2) of the repository module 106 (FIG. 1) receives a file access request from a client device. The file access request specifies a file node to be accessed by way of a file system. In some embodiments, the file access request may be a batch request indicating a plurality of file nodes to be accessed.

In operation 306, the lock mechanism module 204 (FIG. 2) of the repository module 106 (FIG. 1) may reference a counter to identify that the file node is being accessed in response to a different file access request. The counter may be any device which stores (and may sometimes display) the number of times a particular event or process has occurred. The locking mechanism counter may indicate whether the file node is being accessed by someone else. As discussed above, the counter may be configured to track whether the file node is being accessed. If the file access request is a batch request, the lock mechanism module 204 may reference a counter for each of the file nodes specified in the batch request to determine access to each of the file nodes.

In operation 308, the dispatch module 206 (FIG. 2) of the repository module 106 (FIG. 1) may provide access to the file node to the client device when the counter indicates a termination of access to the file node resulting from the different access request. If the request is a batch request, the dispatch module 206 may provide access to each of the file nodes as they become available (e.g., when each of the file nodes is no longer being accessed by another client device).

In some embodiments, the counter may be configured to track whether a file is being read or being modified by adjusting (e.g., incrementing or decrementing) each time the file is accessed. For example, if the file is not being accessed via a client device, the counter may equal zero. If the file is being modified, the counter may decrement when the file is accessed for modification such that the counter=−1, indicating that the file has a write lock. If the file is being read via a client device, the counter may be incremented when the file is accessed to be read such that the counter=1, indicating that the file has a read lock. In some embodiments, any number of client devices may read the file, and the counter is incremented each time the file is read. In that case, if the counter is greater than zero, the counter may indicate that the file is being read by one or more client devices, and the counter may indicate the number of client devices accessing the file (e.g., if the counter=5, there are five client devices accessing the file based on a read request). In the example described above, the counter is incremented when a file is read and decremented when a file is modified; however, the counter may be adjusted in any manner such that the counter may indicate the status of the file.

Figure 4:
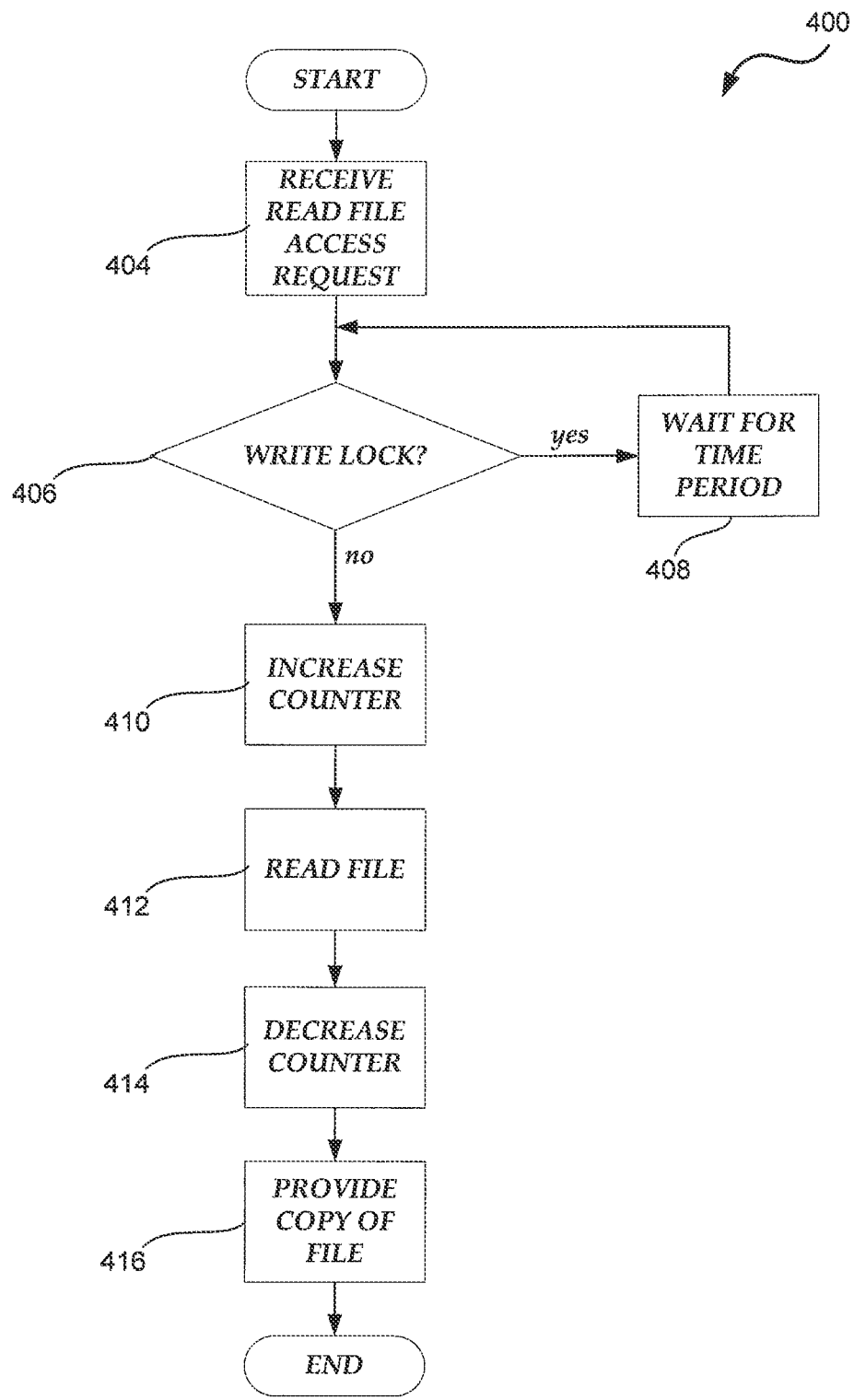
FIG. 4 is a flow diagram of a method of reading a file, in accordance with an example embodiment.

FIG. 4 is a flow diagram of a method 400 of reading a file. In an example embodiment, the method 400 may be implemented by the repository module 106 included in the system 100 of FIG. 1.

In operation 404 of method 400, the request module 202 (FIG. 2) receives a read file access request from a client device. The read file access request specifies a file to be accessed and read by way of a file system.

In some embodiments, a file may not be read if the file is being modified by someone else. For example, the file system server 102 (FIG. 1) may not allow a file to be read if it is being modified by someone else so as to avoid corruption of the file. in operation 406, the lock mechanism module 204 (FIG. 2) may determine whether the file to be read has a write lock associated with the file (e.g., whether the file is being modified by someone else). This may be determined by referencing a lock counter associated with the file. The lock counter may be configured to track whether a file is being modified (e.g., added, changed, deleted, etc.). For example, in some embodiments, when the counter for a particular file has a value of −1, that value may indicate that the file has a write lock associated with the file. In some embodiments, any number of client devices may modify a file simultaneously. In some embodiments, the lock counter may ensure that the file is only accessed by one client device during a write operation. When a file is not being modified (e.g., the file has no write lock), the counter may specify a particular value (e.g., counter≥0). When a file is accessed for modification, the counter may be adjusted by the lock mechanism module 204 (FIG. 2) to reflect the modification to the file and indicate a write lock (e.g., counter=−1). While the example provided indicates that the counter is decremented when the file is being modified, the counter can be adjusted in any manner which indicates the status of the file.

If in operation 406 the lock mechanism module 204 (FIG. 2) references the counter for the file and determines that the file has a write lock (e.g., counter=−1), in operation 408 the lock mechanism module 204 waits for a predetermined time period before referencing the counter again (e.g., operation 406) to determine whether access to the file has become available. This loop may continue until the counter indicates that the file no longer has a write lock (e.g., access to the file based on the other file access request for modification has terminated; e.g., counter≥0).

If in operation 406 the lock mechanism module 204 (FIG. 2) references the counter for the file and determines that the file no longer has a write lock (e.g., counter≥0), in operation 410, the lock mechanism module 204 may increase the counter to indicate the file is being accessed based on a read request (e.g., counter=1). In some embodiments, if the file access request specifies more than one file to be accessed, the counter for each of the files may be incremented such that each counter indicates that the file is being read.

When the counter has been incremented, in operation 412, the file may be read. In some embodiments, the repository module 106 may read the file from the data repository 108 (FIG. 1) and create a copy of the file.

In operation 414, the lock mechanism module 204 (FIG. 2) may decrease the counter to indicate the file access based on that particular file access request has terminated. In operation 416, the copy of the file may be provided to the requesting client device.

Figure 5:
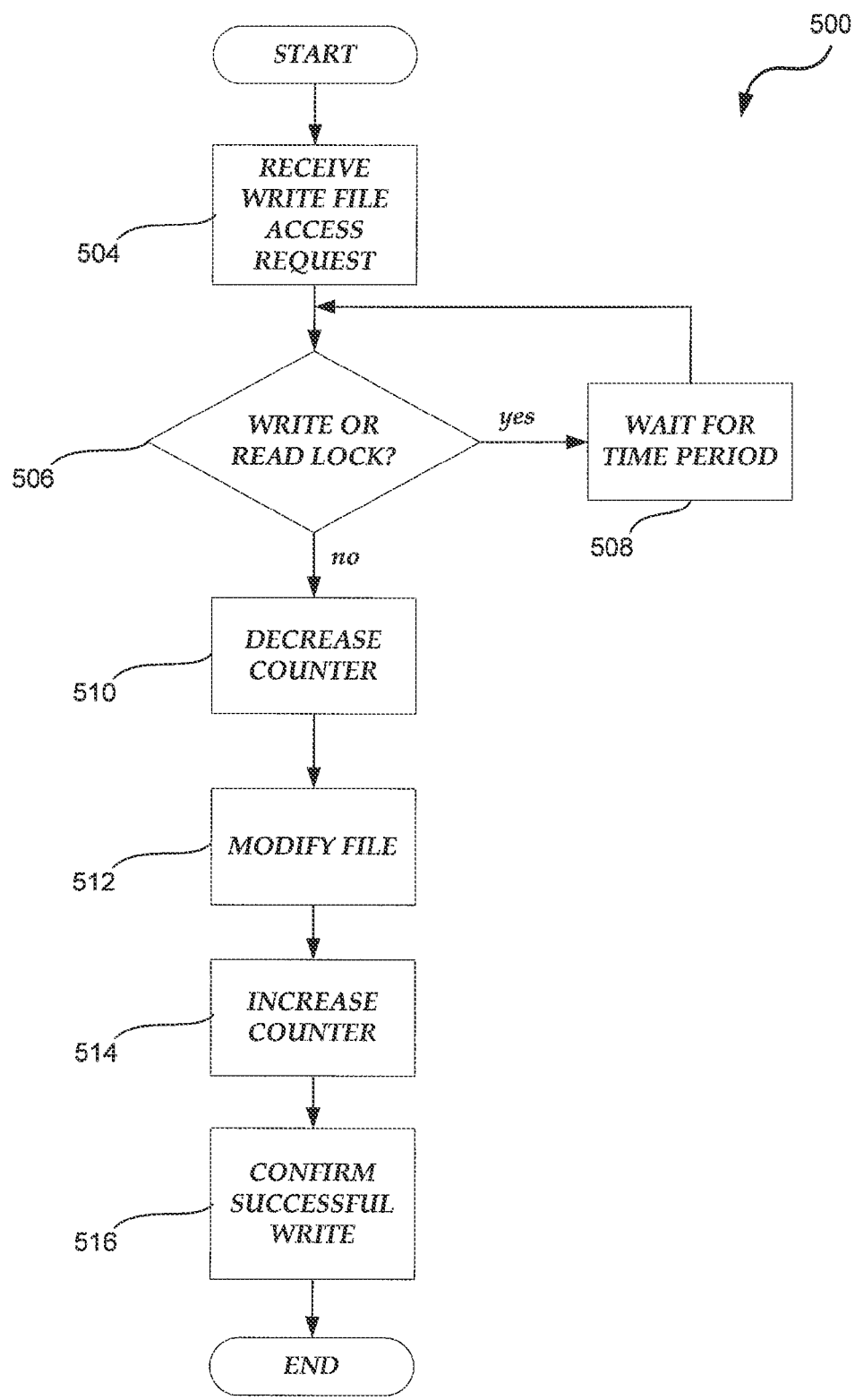
FIG. 5 is a flow diagram of a method of writing to a file, in accordance with an example embodiment.

FIG. 5 is a flow diagram of a method 500 of writing to a file (e.g., modification, deletion, etc.). In an example embodiment, the method 500 may be implemented by the repository module 106 included in the system 100 of FIG. 1.

In operation 504 of method 500, the request module 202 (FIG. 2) receives a write file access request from a client device. The write file access request specifies a file to be accessed and modified by way of a file system.

In some embodiments, a file may not be modified if the file is being read or modified by someone else. For example, the file system server 102 (FIG. 1) may not allow a file to be accessed and modified if it is being read and/or modified by someone else so as to avoid corruption of the file. In operation 506, the lock mechanism module 204 (FIG. 2) may determine whether the file to be modified has a read and/or a write lock associated with the file (e.g., whether the file is being modified and/or being read by someone else). This may be determined by referencing the counter associated with the file. As discussed above, the counter tracks access to a file based on a read and/or write access request. For example, the file may have a write lock if the counter=−1, and the file may have a read lock if the counter>0). If there are no locks on the file (e.g., the file is not being accessed), the counter may equal zero.

If in operation 506 the lock mechanism module 204 (FIG. 2) references the counter and determines that the file is being accessed due to another file access request (e.g., counter≠0), in operation 508 the lock mechanism module 204 waits for a predetermined time period before referencing the counter again (e.g., operation 506) to determine whether access to the file has become available. This loop may continue until the counter indicates that the file has become available (e.g., access to the file based on the other file access request has terminated; e.g., counter=0).

If in operation 506 the lock mechanism module 204 (FIG. 2) references the counter for the file and determines that the file is no longer being accessed due to another file access request (e.g., counter≠0), in operation 510, the lock mechanism module 204 may decrease counter to indicate the file is being modified and to associate the file with a write lock (e.g., counter=−1). In some embodiments, if the file access request specifies more than one file to be accessed, the write lock may be applied to each of the files via a counter associated with each of the files.

When the counter has been decremented, in operation 512, the file may be modified by the client device. Once access to the file has been terminated, in operation 514, the lock mechanism module 204 (FIG. 2) may increase the counter to indicate the file access based on that particular file access request has terminated. In operation 516, the repository module 106 may confirm that the write operation was successful by sending a notification of the confirmation to the client device via the network 110 (FIG. 1).

Figure 6:
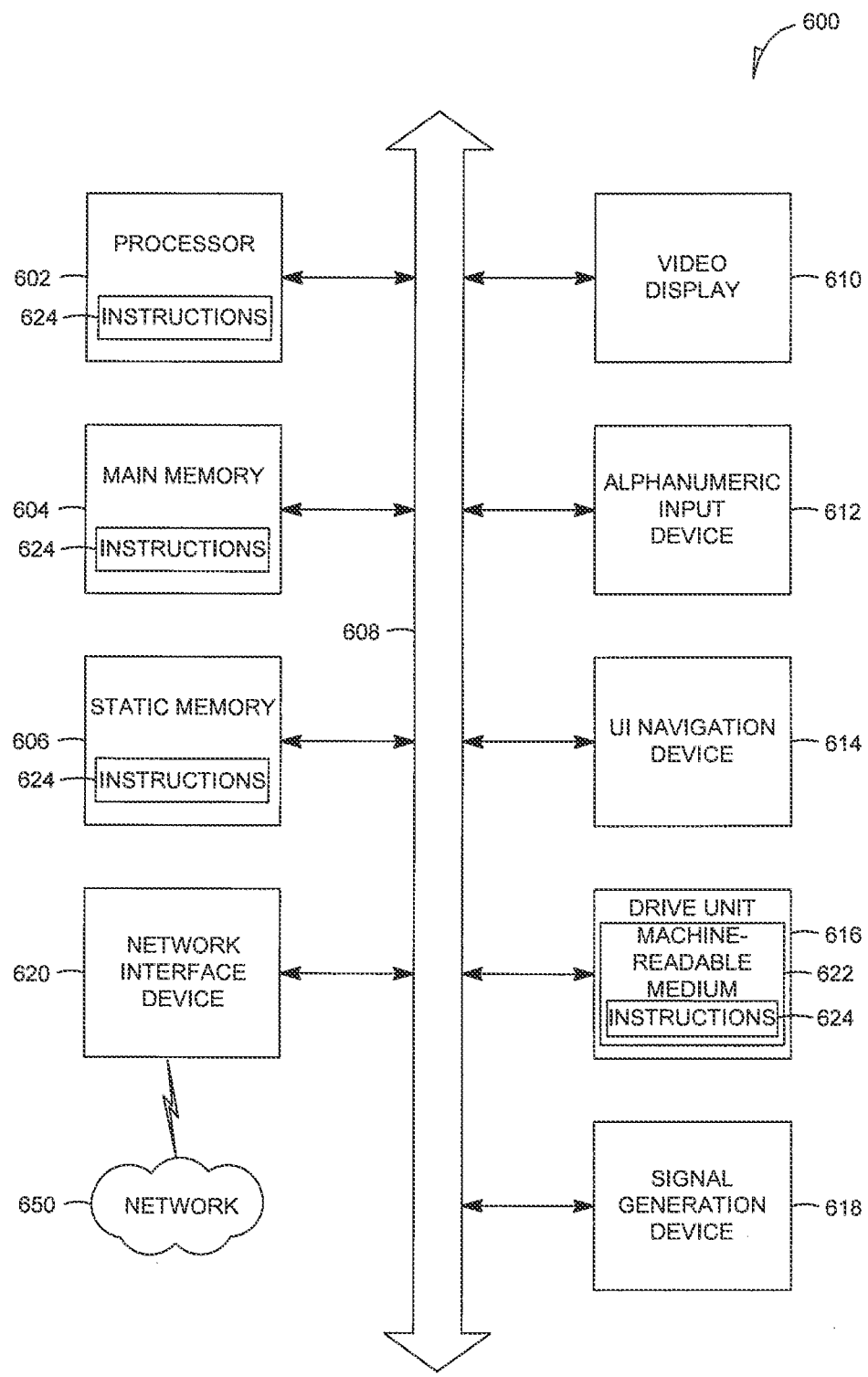
FIG. 6 is a block diagram depicting a machine in the example form of a computing device within which may be executed a set of instructions for causing the machine to perform any one or more of the methodologies discussed herein.

FIG. 6 depicts a block diagram of a machine in the example form of a computing device 600 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 600 includes a processor 602 (e.g., a central processing unit (CPU), a graphics processing unit (GPU) or both), a main memory 604 (e.g., random access memory), and static memory 606 (e.g., static random-access memory), which communicate with each other via bus 608. The computing device 600 may further include video display unit 610 (e.g., a plasma display, a liquid crystal display (LCD) or a cathode ray tube (CRT)). The computing device 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604 and/or within the processor 602 during execution thereof by computing device 600, with the main memory 604 and processor 602 also constituting machine-readable, tangible media.

The data structures and instructions 624 may further be transmitted or received over a computer network 650 via network interface device 620 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 600) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented method operable at a server, the method comprising:

receiving, from a client device, a file access request specifying a file node to be accessed by way of a file system;

referencing a counter to identify that the file node is being accessed in response to a different file access request, the counter being configured to track whether the file node is being accessed; and providing, to the client device, access to the file node when the counter indicates a termination of access to the file node resulting from the different file access request.

2. The computer-implemented method of claim 1, further comprising:
if the counter indicates the file node is being accessed in response to the different file access request, waiting a predetermined amount of time; and
after waiting the predetermined amount of time, referencing the counter to determine whether the file node is being accessed in response to the different file access request.

3. The computer-implemented method of claim 1, wherein the file access request is a request to read the file node, providing access to the file node including providing a copy of the file node to the client device.

4. The computer-implemented method of claim 3, further comprising:
prior to providing access to the file node,
adjusting the counter to indicate the file node is being read;
reading the file node; and
adjusting the counter to indicate the access to the file node resulting from the file access request has terminated,
wherein providing the copy of the file node to the client device is based on the reading of the file node.

5. The computer-implemented method of claim 1, wherein the file access request is a request to modify the file node.

6. The computer-implemented method of claim 5, further comprising:
prior to providing access to the file node, adjusting the counter to indicate the file node is being modified by the client device; and
after providing access to the file node, adjusting the counter to indicate the access to the file node resulting from the file access request has terminated.

7. The computer-implemented method of claim 1, wherein the counter is configured to track whether the file node is being modified.

8. The computer-implemented method of claim 1, wherein the counter is configured to track whether the file node is being read.

9. The computer-implemented method of claim 1, wherein the file node is a file.

10. The computer-implemented method of claim 1, wherein the file node is a folder having one or more files.

11. The computer-implemented method of claim 1, wherein the file access request includes a batch access request specifying a plurality of entities to be accessed.

12. A system comprising:
a hardware-implemented request module configured to receive, from a client device, a file access request specifying a file node to be accessed by way of a file system;
a hardware-implemented lock mechanism module configured to reference a counter to identify that the file node is being accessed in response to a different file access request, the counter being configured to track whether the file node is being accessed; and
a hardware-implemented dispatch module configured to provide to the client device access to the file node when the counter indicates a termination of access to the file node resulting from the different file access request.

13. The system of claim 12, wherein the hardware-implemented lock mechanism module is further configured to wait a predetermined amount of time if the counter indicates the file node is being accessed in response to the different file access request and reference the counter to determine whether the file node is being accessed in response to the different file access request after waiting the predetermined amount of time.

14. The system of claim 12, wherein the file access request is a request to read the file node, the hardware-implemented dispatch module configured to provide a copy of the file node to the client device.

15. The system of claim 14, wherein the hardware-implemented lock mechanism module is further configured to:
prior to providing access to the file node:
adjust the counter to indicate the file node is being read;
read the file node; and
adjust the counter to indicate the access to the file node resulting from the file access request has terminated,
wherein providing the copy of the file node to the client device is based on the reading of the file node.

16. The system of claim 12, wherein the file access request is a request to modify the file node.

17. The system of claim 16, wherein the hardware-implemented lock mechanism module is further configured to adjust the counter to indicate the file node is being modified by the client device prior to providing access to the file node and adjust the counter to indicate the access to the file node resulting from the file access request has terminated after providing access to the file node.

18. A machine-readable, non-transitory storage medium storing instructions which, when executed by one or more processors, cause the one or more processors to perform operations, comprising:
receiving, from a client device, a file access request specifying a file node to be accessed by way of a file system;
referencing a counter to identify that the file node is being accessed in response to a different file access request, the counter being configured to track whether the file node is being accessed; and
providing, to the client device, access to the file node when the counter indicates a termination of access to the file node resulting from the different file access request.

19. The machine-readable, non-transitory storage medium of claim 18, wherein the counter is configured to track whether the file node is being modified or whether the file node is being read.

20. The machine-readable, non-transitory storage medium of claim 18, wherein the instructions cause the one or more processors to perform operations, further comprising:
if the counter indicates the file node is being accessed in response to the different file access request, waiting a predetermined amount of time; and
after waiting the predetermined amount of time, referencing the counter to determine whether the file node is being accessed in response to the different file access request.

* * * * *